(12) United States Patent
Cook

(10) Patent No.: US 6,212,975 B1
(45) Date of Patent: Apr. 10, 2001

(54) ADAPTIVE FILTER WITH SWEEP FILTER ANALYZER FOR A VORTEX FLOWMETER

(75) Inventor: Warren E. Cook, Norton, MA (US)

(73) Assignee: The Foxboro Company, Foxboro, MD (US)

(*) Notice: Subject to any disclaimer, the term of this patent is extended or adjusted under 35 U.S.C. 154(b) by 0 days.

(21) Appl. No.: 09/221,088

(22) Filed: Dec. 28, 1998

(51) Int. Cl.[7] .............................. G01F 1/32; G01N 23/00
(52) U.S. Cl. ........................................ 78/861.22; 702/190
(58) Field of Search ........................... 73/861.22, 861.19; 702/190, 45

(56) References Cited

U.S. PATENT DOCUMENTS

| | | |
|---|---|---|
| 5,429,001 | 7/1995 | Kleven . |
| 5,576,497 | 11/1996 | Vignos et al. . |
| 5,748,507 * | 5/1998 | Abatzoglou et al. ................. 702/76 |
| 5,804,741 * | 9/1998 | Freeman ............................ 73/861.356 |
| 5,873,054 * | 2/1999 | Warburton et al. .................. 702/190 |

* cited by examiner

Primary Examiner—Harshad Patel
(74) Attorney, Agent, or Firm—Foley, Hoag & Eliot; W. Hugo Liepmann; Kevin A. Oliver

(57) ABSTRACT

A digital signal processing system operating in conjunction with a vortex flowmeter passes a digital representation of a flowmeter signal into a multistage decimator having two outputs. The two outputs correspond to the vortex flowmeter signal downsampled to two different sampling frequencies. One of the two outputs passes to an on-line channel having an adaptive bandpass filter for tracking the fundamental frequency of the vortex flowmeter signal, thereby continuously monitoring the flow rate. The other of the two outputs passes to an off-line channel having a tunable bandpass filter that can be used to observe frequency components other than those near the fundamental frequency. The system thus enables maintenance personnel to conveniently monitor the noise spectrum generated by the flow without interrupting the operation the flow measurement.

14 Claims, 3 Drawing Sheets

ADAPTIVE FILTER WITH SWEEP FILTER ANALYZER FOR A VORTEX FLOWMETER

This invention relates to flow meters, and, in particular, to digital signal processing systems for processing signals from vortex flowmeters.

BACKGROUND

When fluid flows past an obstacle, the obstacle causes a disturbance in the fluid flow. This disturbance is manifested by a vortex generated on one side of the obstacle followed shortly thereafter by another vortex generated on the other side of the obstacle. The two sides of the obstacle continue to alternately generate, or shed, vortices so long as the fluid continues to flow. The frequency at which the two sides of the obstacle shed these vortices is proportional to the velocity of the fluid relative to the obstacle. It is this phenomenon that is the basis for the operation of the known vortex flowmeter.

In a vortex flowmeter, an obstacle in the fluid flow, generally a bluff body, generates an alternating series of vortices. These vortices flow past a pressure transducer at or near the bluff body. Since each vortex is associated with a low pressure zone in the fluid, each time a vortex flows past the pressure transducer, it causes the pressure transducer to generate a pulse having an amplitude proportional to the fluid density and to the square of the fluid velocity. Since the vortices flow with the fluid, the frequency of these pressure pulses is proportional to the fluid velocity. The signal generated by the pressure transducer thus includes a fundamental frequency corresponding to the fluid velocity.

In addition to information about the fluid velocity, the signal generated by the pressure transducer also contains low-frequency components corresponding to other disturbances, such as vibrations from motors, pumps, or unsupported sections of the pipe through which the fluid flows. The transducer signal can also contain high frequency components from other acoustic sources, such as loud noises in the room through which the pipe flows. Additional signal components, both high and low frequency, can also arise from fluid turbulence within the pipe.

These extraneous signal components, collectively referred to as "noise", are generally filtered out by a bandpass filter having a center frequency at or near the vortex shedding frequency. However, the fact that the vortex shedding frequency is unknown and constantly changing seriously hampers the ease with which one can tune a bandpass filter to that frequency. This difficulty is addressed by the adaptive bandpass filter disclosed in Vignos, U.S. Pat. No. 5,576,497, "Adaptive Filtering for a Vortex Flowmeter," which is incorporated herein by this reference.

The noise components rejected by the adaptive bandpass filter are not, however, without some value. For example, subtle changes in the spectrum of the noise generated by a pump or motor can foreshadow an imminent mechanical breakdown. Because the pressure signal is responsive to fluid density, changes in the spectrum of the pressure signal can indicate an undesirable change in the composition of the fluid flowing through the pipe. It is therefore useful to monitor the noise components rejected by the adaptive bandpass filter.

In order to adjust the filter passband to match the changing fluid velocity, the adaptive bandpass filter disclosed in Vignos continuously monitors the pressure signal. If the adaptive bandpass filter "looks away," it is apt to lose track of the fluid velocity and to be unable to recover for some time. As a result, it is impractical to attempt time division multiplexing of the signal from the pressure transducer to the adaptive bandpass filter.

One known approach to observing the noise spectrum is to connect a sweep filter analyzer or similar device directly to the pressure transducer, in parallel with the adaptive bandpass filter. This, however, is a cumbersome procedure since it requires a separate connection at the transducer, an additional piece of hardware, and significant additional power consumption.

What is therefore desirable in the art is a system that can simultaneously track the velocity component of the pressure transducer signal and observe the noise components of that signal.

SUMMARY

The invention provides an integrated digital signal processing system that frequency multiplexes the flowmeter signal from a vortex flowmeter and makes it available to an on-line channel, for tracking the velocity component of the signal, and to an off-line channel, for monitoring the noise components of the pressure transducer signal.

One feature of the invention provides a digital signal processing system, embodied in an integrated circuit, that includes a decimator having two output signals, each of which corresponds to the vortex flowmeter signal sampled at a different sampling rate. These two output signals are provided to two separate channels: an on-line channel that includes an adaptive bandpass filter having a passband responsive to the vortex flowmeter signal, and an off-line channel that includes a tunable bandpass filter having a dynamically selectable passband.

The adaptive bandpass filter of the on-line channel is typically responsive to the fundamental frequency of the flowmeter signal and is typically selected to pass only a narrow band of frequencies around the fundamental frequency.

The tunable bandpass filter typically has a passband that does not depend on the flowmeter signal but is instead controlled by an external source. The external source can sweep the passband of the tunable bandpass filter across a range of frequencies, in which case the tunable bandpass filter functions as a sweep frequency analyzer. Alternatively, the passband can be selected to monitor a fixed range of frequencies in the flowmeter signal in order to closely monitor the operation of a component, such as a pump, associated with the generation of noise in that range of frequencies.

In one non-limiting practice of the invention, the decimator is a multistage decimator having a stage for generating a downsampled signal by downsampling the flowmeter signal to a first sampling frequency and a subsequent stage for upsampling the downsampled signal to a second sampling frequency higher than the first sampling frequency. The subsequent stage can include a sample-and-hold circuit for controlling the sampling frequency corresponding to the two components generated as the output of the decimator.

The off-line channel can include an intermediate frequency filter having a fixed passband, preferably centered at sixty degrees, and software or hardware for shifting the second decimator output such that the frequencies of interest in the second decimator output lie in the fixed passband of the intermediate frequency filter. Such software or hardware can include a mixer for multiplying the second decimator output by a square wave having a user-selectable frequency.

The foregoing system thus enables the simultaneous tracking of the velocity component of a vortex flowmeter signal with the monitoring of the noise components of the same signal. When implemented as an integrated circuit, a digital signal processing system according to the invention provides this functionality with virtually no additional power consumption and without requiring connection of additional hardware to the vortex flowmeter.

BRIEF DESCRIPTION OF THE DRAWINGS

The foregoing and other objects, features and advantages of the invention will be apparent from the following description and apparent from the accompanying drawings, in which.

DETAILED DESCRIPTION

Figure 1:
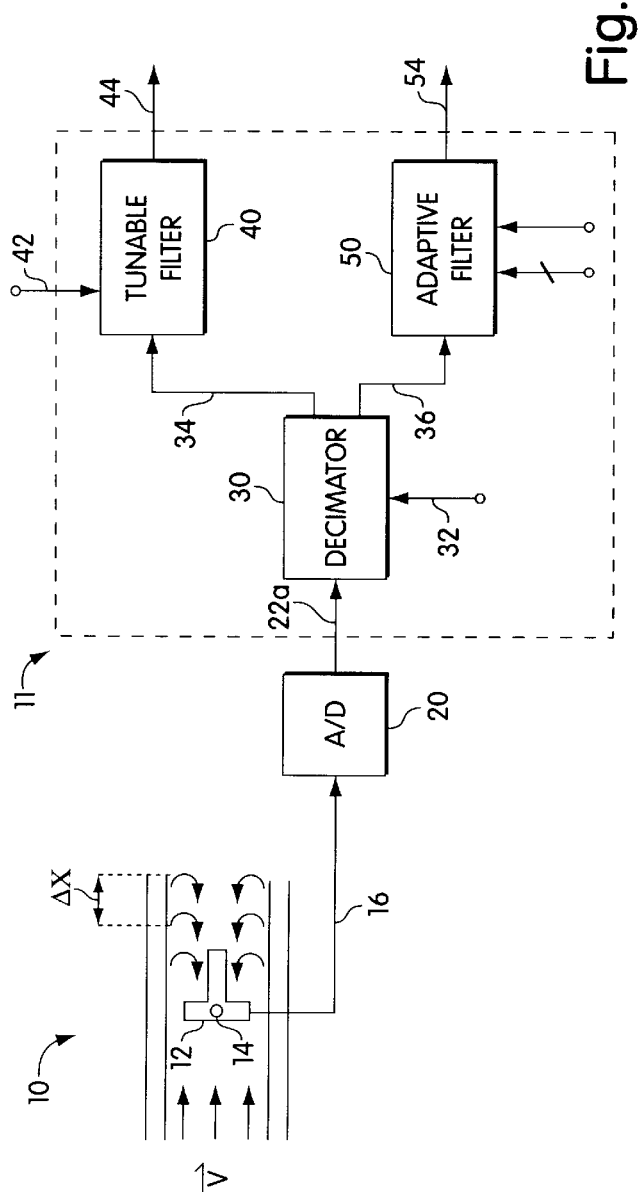
FIG. 1 is a block diagram showing a system embodying the invention.
Figure 2:
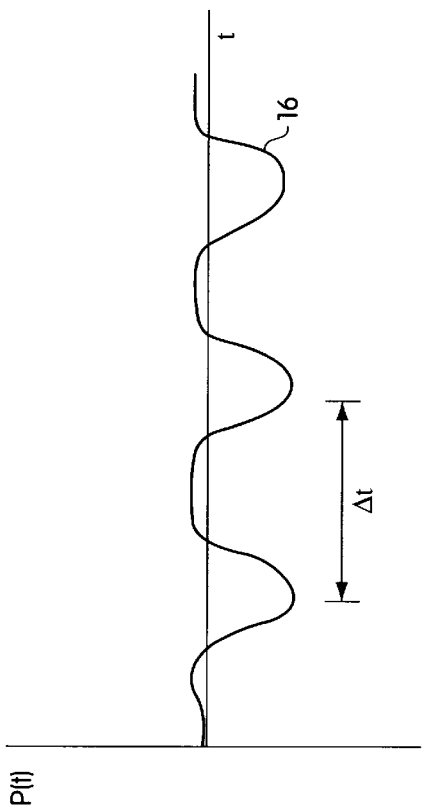
FIG. 2 is a typical meter signal generated by the pressure transducer in FIG. 1.

In FIG. 1, a vortex flowmeter 10 within a fluid conduit has a bluff body 12 in the path of a fluid having a longitudinal component of flow velocity $v_x$ relative to the bluff body 12. Each of the two sides of the bluff body 12 sheds a train of vortices separated by a distance $\Delta x$ that depends on the magnitude of the flow velocity. The two vortex trains thus generated are approximately 180 degrees out of phase with each other. These vortices result in the detection of a periodic differential pressure pulse by a pressure transducer 14 disposed at or near the bluff body 12. The pressure transducer 14 transforms this sequence of pressure pulses into a flowmeter signal 16, an example of which is shown in FIG. 2. The flowmeter signal 16 is a periodic pulse train having pulses separated by an interval $\Delta t$ proportional to $v_x$. The fundamental frequency of this flowmeter signal 16 thus provides a measure of the longitudinal component $v_x$ of the flow velocity.

An A/D converter 20, preferably a delta modulator, converts the flowmeter signal 16 into a serial bit stream 22a that is provided to a multistage decimator 30. The decimator 30, in response, downsamples the serial bit stream 22a by a downsampling factor dependent on an externally supplied decimator control signal 32. The multistage decimator 30 generates two output signals: a first decimator output signal 36 corresponding to the serial bit stream 22a downsampled to a first sampling frequency, and a second decimator output signal 34 corresponding to the serial bit stream 22a downsampled to a second sampling frequency. In one preferred embodiment, the second sampling frequency is four times the first sampling frequency, however other integer multiples can be used with similar effect.

The first decimator output signal 36, which is representative of the flowmeter signal 16, is passed to an adaptive bandpass filter 50 having a passband that moves in response to changes in the fundamental frequency of the flowmeter signal 16. Since the adaptive bandpass filter 50 receives the first decimator output signal 36 through a dedicated channel, it is able to continuously monitor the first decimator output signal 36 and thereby continuously track the changing fundamental frequency of the flowmeter signal 16. The resulting adaptive filter output signal 54 is therefore a digital representation of the flowmeter signal 16, with those noise components beyond the vicinity of the fundamental frequency significantly attenuated. This relatively noise-free signal thus provides a good estimate of the fundamental frequency of the flowmeter signal 16, and hence, the longitudinal component of fluid velocity $v_x$ relative to the bluff body.

Meanwhile, the second decimator output signal 34 is provided to a tunable bandpass filter 40 having a passband externally controllable by a tuning signal 42. This passband is controllable independently of the passband of the adaptive bandpass filter 50. As a result, by suitably selecting the passband, those frequency components that are attenuated by the adaptive bandpass filter 50 can be made available in the tunable filter output 44 signal without interrupting or interfering with the operation of the adaptive bandpass filter 50.

Since a sweep frequency analyzer is essentially a tunable bandpass filter in combination with a controller for sweeping the filter passband across a selected range of frequencies, it is apparent that the tunable bandpass filter 40 functions as a sweep frequency analyzer when the tuning signal 42 is chosen to tune the filter passband of the tunable bandpass filter 40 across a range of frequencies.

Figure 3:
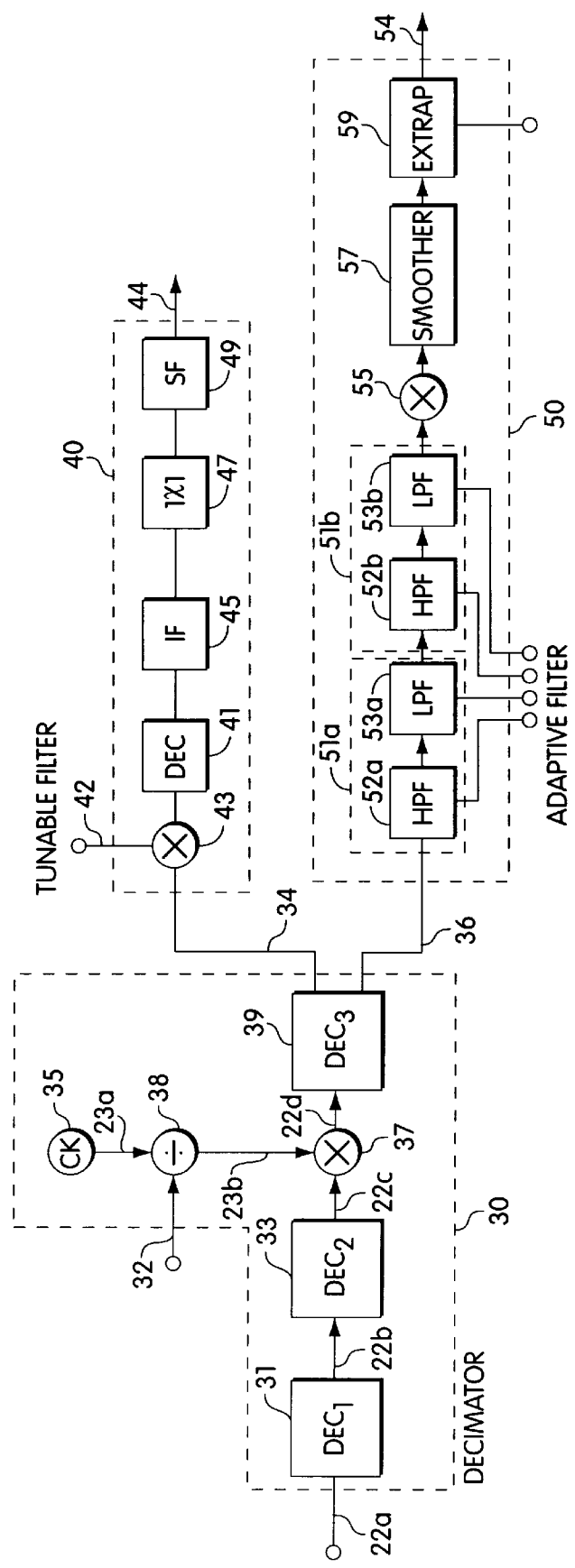
FIG. 3 is a more detailed block diagram of the system shown in FIG. 1.

In general, the output signal of a decimator corresponds to every $M^{th}$ input value of the input signal to the decimator, where M is an integer. In principle then, the decimator 30 can be implemented in a single stage. However, the gradual change in sampling rate that is achieved in a multistage decimator results in significant relaxation in the requirements for the anti-aliasing filter associated with each decimation stage. For this reason, it is advantageous to implement the decimator 30 as a multi-stage decimator as shown in FIG. 3.

A multistage decimator 30, for practice of this invention includes a first decimator stage 31 in series with a second decimator stage 33. The second decimator stage 33 drives a third decimator stage 39 through a sample-and-hold circuit 37. The sample-and-hold circuit also receives control information from an externally supplied decimator control signal 32. More particularly, the illustrated first decimator stage 31 reduces the sampling frequency of the serial bit stream 22a by a factor of sixteen, thereby producing a first downsampled serial bit stream 22b. The second decimator stage 33 further downsamples the first downsampled serial bit stream 22b by a factor of two, thereby generating a second downsampled serial bit stream 22c having a sampling frequency reduced by a factor of thirty-two relative to the serial bit stream 22a. In one preferred embodiment, as illustrated, the serial bit stream 22a corresponds to a sampling frequency of 250 kHz, and the second downsampled serial bit stream 22c corresponds to a sampling frequency of 7.8125 kHz.

In order to provide coverage for the frequency range of interest, the output of the multistage decimator 30 preferably has a sampling frequency consistent with the expected range of vortex shedding frequencies. Control over the output sampling frequency of the multistage decimator 30 is provided by a divider 38 for dividing a clock signal 23a by the externally supplied decimator control signal 32. In the illustrated preferred embodiment, the clock signal 23a is generated by a 500 kHz clock 35 and the decimator control signal 32 is chosen such that the resultant quotient 23b is 1, 2, 4, 8, 16, 32, or 64. The quotient 23b controls a sample-and-hold circuit 37 for upsampling the second downsampled serial bit stream 22c, thereby generating an upsampled serial bit stream 22d which becomes the input to a third fixed decimator 39. The extent to which the sample-and-hold circuit 37 upsamples the second downsampled serial bit stream 22c thus depends on the value of the decimator control signal 32.

Figure 4:
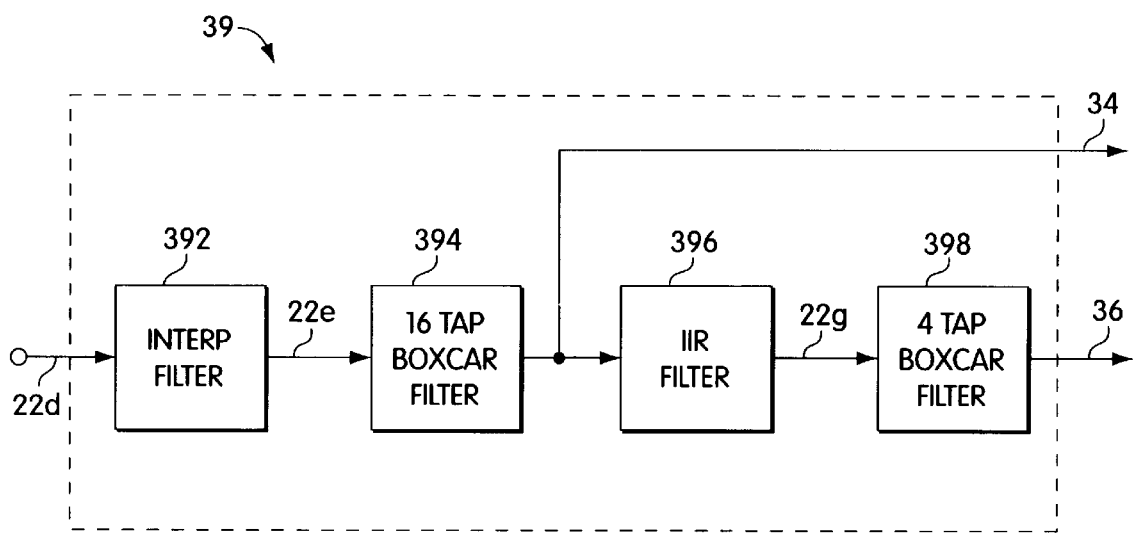
FIG. 4 is a detailed block diagram of the decimator of FIG. 3.

The illustrated third fixed decimator 39 includes a series of four cascaded filters, as shown in FIG. 4. The upsampled serial bit stream 22d is the input to an interpolation filter 392 having poles chosen to attenuate the spectrum of the upsampled serial bitstream 22d by 6 db at 10.3° and by 3 db at 6°. The interpolation filter output signal 22e is then decimated by a first boxcar filter 394, which, in the preferred embodiment, is a sixteen tap boxcar filter implemented by a sixteen tap accumulator. The output signal of this first boxcar filter corresponds to the second decimator output signal 34.

The first boxcar filter output signal is also provided to a 30° IIR (infinite impulse response) filter 396. The IIR filter output signal 22g is then passed to a second boxcar filter 398 for decimation by a factor of four. This second boxcar filter 398, which is implemented as a four tap accumulator, and the IIR filter 396, together attenuate any aliasing frequencies present in the first boxcar filter output signal by at least an additional 40 db. The output signal of the second boxcar filter, which now corresponds to the first decimator output 36, is then passed to the adaptive bandpass filter 50.

The third decimator stage 39 thus generates two different outputs, both of which correspond to the serial bit stream 22a, but sampled at two different sampling rates as a result of having undergone decimation in the manner described above. The first decimator output signal 36 is provided to the adaptive bandpass filter 50. The second decimator output signal 34, which corresponds to the first decimator output signal 36 but sampled at a different sampling rate, is provided to the tunable filter 40.

Referring again to FIG. 3, the adaptive bandpass filter 50 includes a first high-pass filter 52a connected in series with a first low-pass filter 53a, both of which have cut-off and cut-on frequencies under the control of an adaptive control system that alters the filter coefficients or the sampling frequency in response to the flowmeter signal 16. Together, the first high-pass filter 52a and the first low-pass filter 53a function as a first bandpass filter 51a having a passband that 13 moves in response to the flowmeter signal 16, in the manner described by U.S. Pat. No. 5,576,497 to Vignos. The illustrated adaptive bandpass filter 50 further includes a second high-pass filter 52b and a second low-pass filter 53b connected in series, in a manner similar to the first high-pass filter 52a and the first low-pass filter 53a. The second high-pass filter 52b and the second low-pass filter 53b together form a second bandpass filter 51b whose passband likewise moves, under the control of an adaptive control system, to track the vortex shedding frequency. The first and second bandpass filters 51a, 51b cooperate to pass only that portion of the first decimator output 36 having frequency components in a pre-selected band around the vortex shedding frequency.

In order to increase temporal resolution and reduce tphase jitter in the adaptively filtered output signal, the illustrated embodiment includes further optional elements that quadruple the sampling frequency and smooth the data. These functions are performed by a second sample-and-hold circuit 55 connected to receive the output of the second bandpass filter 51b, a smoothing filter 57 connected to receive the output signal of the second sample-and-hold circuit 55, and an extrapolating circuit 59 connected to receive the output signal of the smoothing filter 57. The output of the extrapolating circuit 59 forms the adaptive filter output signal 54.

In the illustrated preferred implementation of the tunable bandpass filter 40, shown in FIG. 3, the filter passband of an IF (intermediate frequency) filter 45 remains fixed as a mixer 43 shifts the signal spectrum of the second decimator output 34 along the frequency axis until the spectral components of interest lie in the passband of the IF filter 45. The mixer 43 shifts the spectrum of the second decimator output 34 by mixing it with an externally controllable tuning signal 42 such as a square wave having a selected frequency.

A decimator 41 connected to receive the mixer output doubles its sampling frequency of and thereby halves its bandwidth. This upsampling step ensures that any undesired sum frequencies generated by mixing the second decimator output signal 34 with the tuning signal 42 fall outside the filter passband of the IF filter 45.

The IF filter 45, connected to receive the upsampled signal from the decimator 41, filters those frequency components outside its passband. In the preferred embodiment, it is preferable, for ease of filter construction, to center the passband of the IF filter at 60°.

The output of the IF filter 45, which is a time-varying quantity, is applied to an absolute value circuit 47 in series with a smoothing filter 49. The absolute value circuit 47 and the smoothing filter 49 together provide the average amplitude 44 of the filtered signal generated by the IF filter 45. This average amplitude 44 is the output of the tunable bandpass filter 40.

It is apparent from the foregoing that selected frequency bands of the spectrum of the flowmeter signal 16 are observable by the tunable bandpass filter 40 without interrupting the adaptive bandpass filter 50 and without interfering with its frequency tracking function. As a result, field service personnel performing routine maintenance on a vortex flowmeter equipped with a digital signal processing system 11 as described herein have access to the entire noise spectrum detected by the pressure transducer 14.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall there between. Having described the invention, what is claimed as new and secured by Letters Patent is:

1. A digital signal processing system for processing a flowmeter signal from a vortex flowmeter, said system comprising a decimator for downsampling said flowmeter signal, said decimator having a first decimator output corresponding to said flowmeter signal downsampled to a first sampling frequency and a second decimator output corresponding to said flowmeter signal downsampled to a second sampling frequency, an on-line channel configured to monitor said first decimator output and to filter said first decimator output with an adaptive bandpass filter having a passband responsive to said first decimator output, thereby generating a first component of said flowmeter signal, and an off-line channel configured to filter said second decimator output with a-filter having a dynamically selectable passband, thereby generating a second component of said flowmeter signal.

2. The system of claim 1 wherein said decimator comprises means for downsampling said flowmeter signal to a first sampling frequency, thereby generating a downsampled signal, and means for upsampling said downsampled signal to a second sampling frequency higher than said first sampling frequency.

3. The system of claim 2 wherein said upsampling means comprises a sample-and-hold circuit.

4. The system of claim 1 wherein said on-line channel comprises a high-pass filter having a cut-on frequency, and a low-pass filter connected in series with said high-pass filter, said low-pass filter having a cut-off frequency higher than said cut-on frequency, said low-pass filter and said high-pass filter cooperating to form a bandpass filter having a pass-band between said cut-on frequency and said cut-off frequency.

5. The system of claim 1 wherein said off-line channel comprises means for frequency-shifting said second decimator output, thereby generating a shifted decimator output, and an intermediate frequency filter configured to filter said shifted decimator output.

6. The system of claim 5 wherein said intermediate frequency filter has a passband centered at 60 degrees.

7. The system of claim 5 wherein said frequency-shifting means comprises a mixer for multiplying said second decimator output by a square wave having a selected frequency.

8. A method for processing a flowmeter signal from a vortex flowmeter, said method comprising the steps of generating a first decimator output corresponding to said flowmeter signal downsampled to a first sampling frequency, generating a second decimator output corresponding to said flowmeter signal downsampled to a second sampling frequency, filtering said first decimator output with an adaptive bandpass filter having a passband responsive to said first decimator output, thereby generating said first component, and filtering said second decimator output with a filter having a dynamically selectable passband, thereby generating said second component.

9. The method of claim 8 wherein said step of generating said first decimator output comprises the steps of downsampling said flowmeter signal to a first sampling frequency, thereby generating a downsampled signal, and upsampling said downsampled signal to a second sampling frequency higher than said first sampling frequency.

10. The method of claim 9 wherein said upsampling step comprises providing a sample-and-hold circuit.

11. The method of claim 8 wherein said step of filtering said first decimator output comprises the steps of providing a high-pass filter having a cut-on frequency, and providing a low-pass filter connected in series with said high-pass filter, said low-pass filter having a cut-off frequency higher than said cut-on frequency, said low-pass filter and said high-pass filter cooperating to form a bandpass filter having a pass-band between said cut-on frequency and said cut-off frequency.

12. The method of claim 8 wherein said step of filtering said second decimator output comprises the steps of frequency-shifting said second decimator output, thereby generating a shifted decimator output, and filtering said shifted decimator output through an intermediate frequency filter.

13. The method of claim 12 wherein said step of filtering said shifted decimator output comprises the step of selecting an intermediate frequency filter passband to be centered at 60 degrees.

14. The method of claim 12 wherein said step of frequency-shifting said second decimator output comprises the step of multiplying said second decimator output by a square wave having a selected frequency.

* * * * *